United States Patent [19]

Gole et al.

[11] 4,321,540
[45] Mar. 23, 1982

[54] ELECTRIC PROSPECTING OF THE SUBSOIL WITH LINEAL ELECTRODES

[75] Inventors: François Golé, Meudon; Jean-Pierre Rocroi, Massy, both of France

[73] Assignee: Compagnie Generale de Geophysique, Massy, France

[21] Appl. No.: 936,000

[22] Filed: Aug. 22, 1978

[30] Foreign Application Priority Data

Sep. 1, 1977 [FR] France .................................. 77 26559

[51] Int. Cl.³ .............................................. G01V 3/02
[52] U.S. Cl. .................................................. 324/357
[58] Field of Search ................. 324/1, 9, 10, 346, 357, 324/359, 372

[56] References Cited

U.S. PATENT DOCUMENTS

| | | | |
|---|---|---|---|
| 1,719,786 | 7/1929 | Schlumberger | 324/1 |
| 1,863,542 | 6/1932 | Nichols et al. | 324/1 |
| 2,181,601 | 11/1939 | Jakosky | 324/1 X |
| 2,183,565 | 12/1939 | Hawley | 324/1 |
| 2,211,124 | 8/1940 | Jakosky | 324/1 X |
| 2,261,563 | 11/1941 | Rieber | 324/359 |
| 2,277,707 | 3/1942 | Lee | 324/357 |
| 2,359,894 | 10/1944 | Brown et al. | 324/346 |
| 2,400,593 | 5/1946 | Neufeld | 324/1 |
| 2,796,235 | 6/1957 | Quigley | 324/357 X |
| 3,113,265 | 12/1963 | Woods et al. | 324/357 |
| 3,125,717 | 3/1964 | Ghose | 324/9 X |
| 3,151,291 | 9/1964 | Eisler | 324/1 |
| 3,319,158 | 5/1967 | McDoulett et al. | 324/357 |
| 3,329,891 | 7/1967 | Todd | 324/359 |

*Primary Examiner*—Gerard R. Strecker
*Attorney, Agent, or Firm*—Schwartz, Jeffery, Schwaab, Mack, Blumenthal & Koch

[57] ABSTRACT

The invention concerns electrical prospecting of the subsoil. According to the invention, electrical prospecting is performed with either continuous or alternating current by using a drilling tubing as at leasts one of two lineal exciter electrodes. The profile of apparent resistivity thus obtained gives a very definite indication of the presence of deep anomalies, even those situated under high resistivity layers or masks, which is frequently the case in the search for deposits. Comparing the real resistivity profile with the theoretical curve obtained from a preliminary model, the extent of the deposit can be determined. The invention applies principally to petroleum, mineral or geothermal exploration.

25 Claims, 11 Drawing Figures

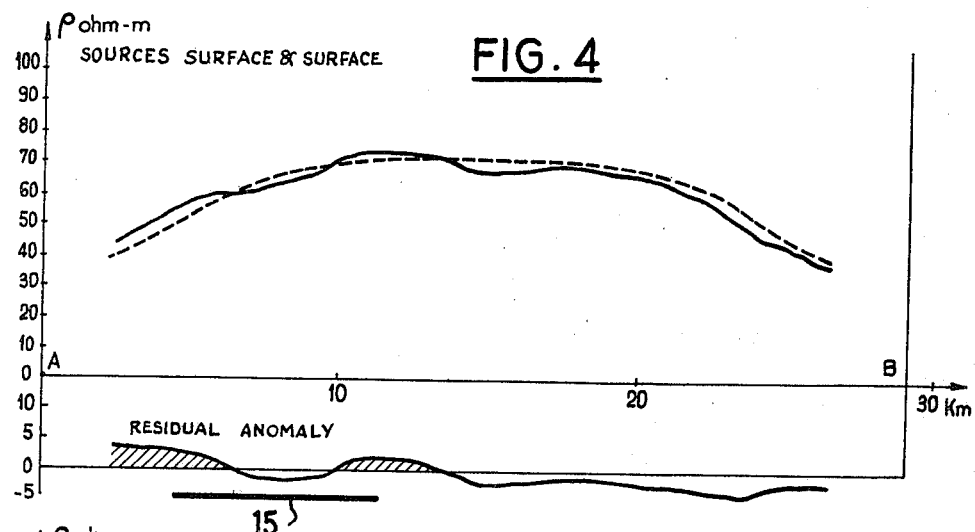
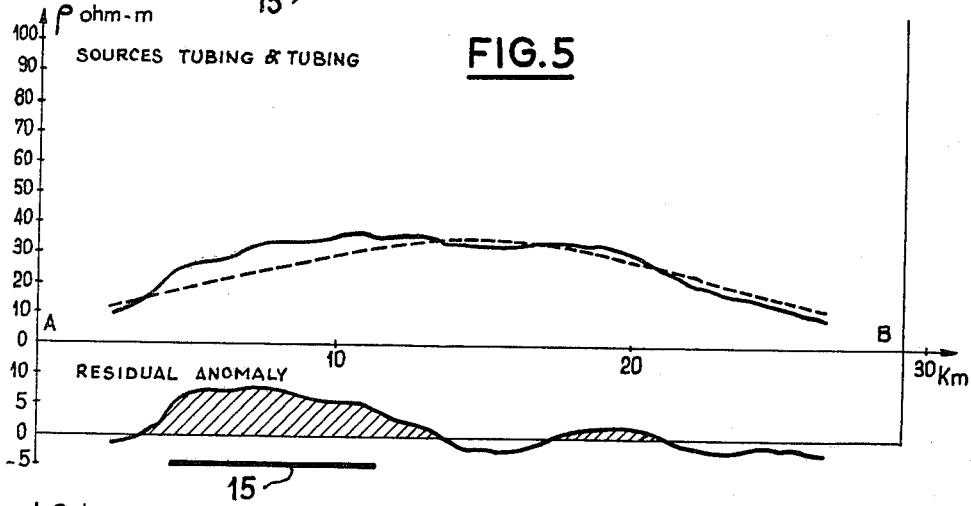
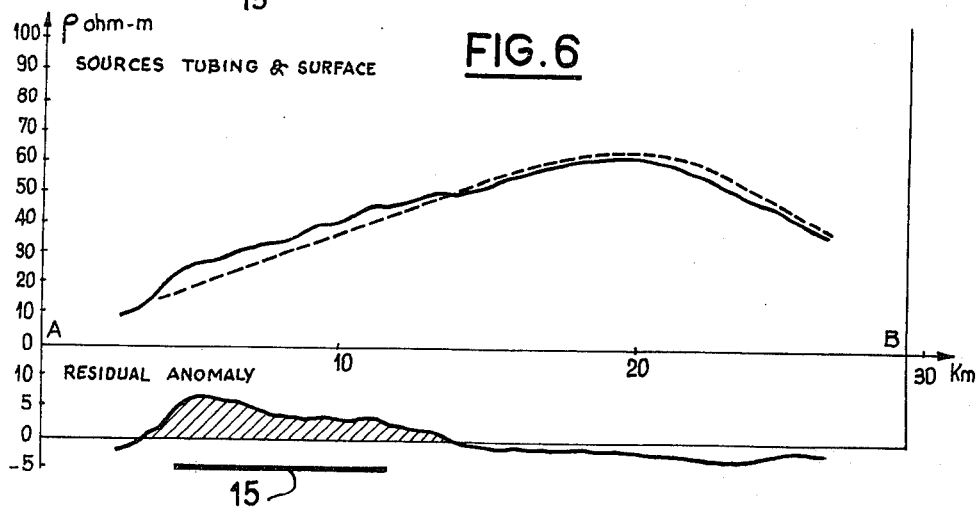

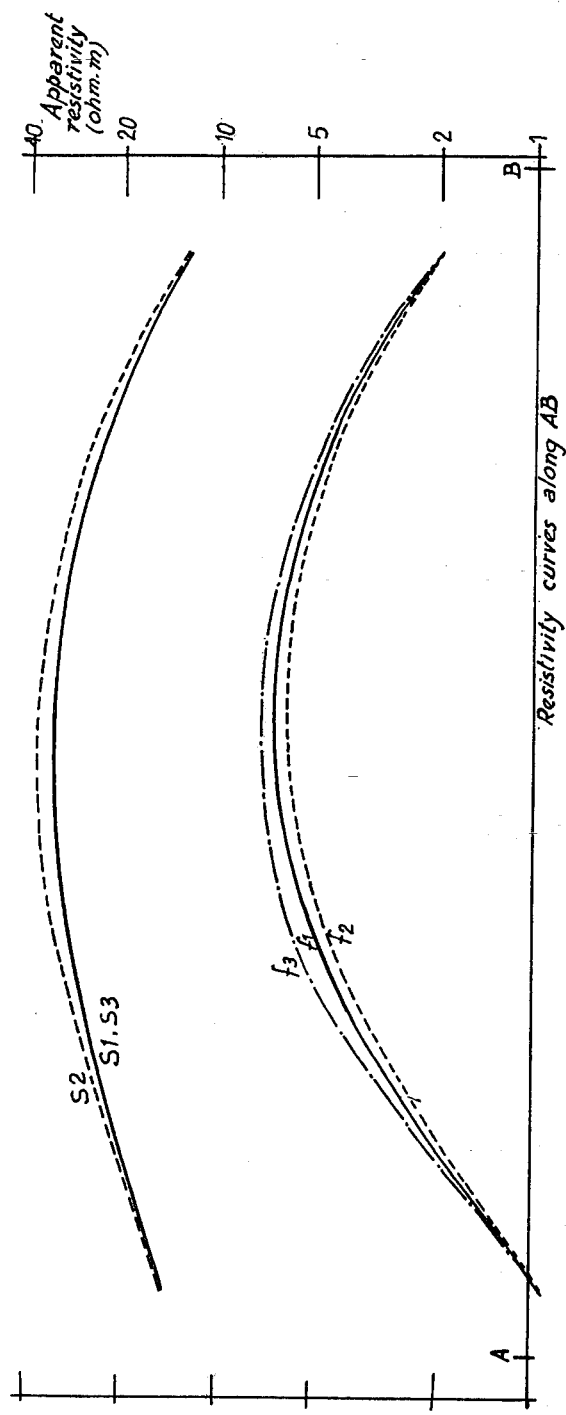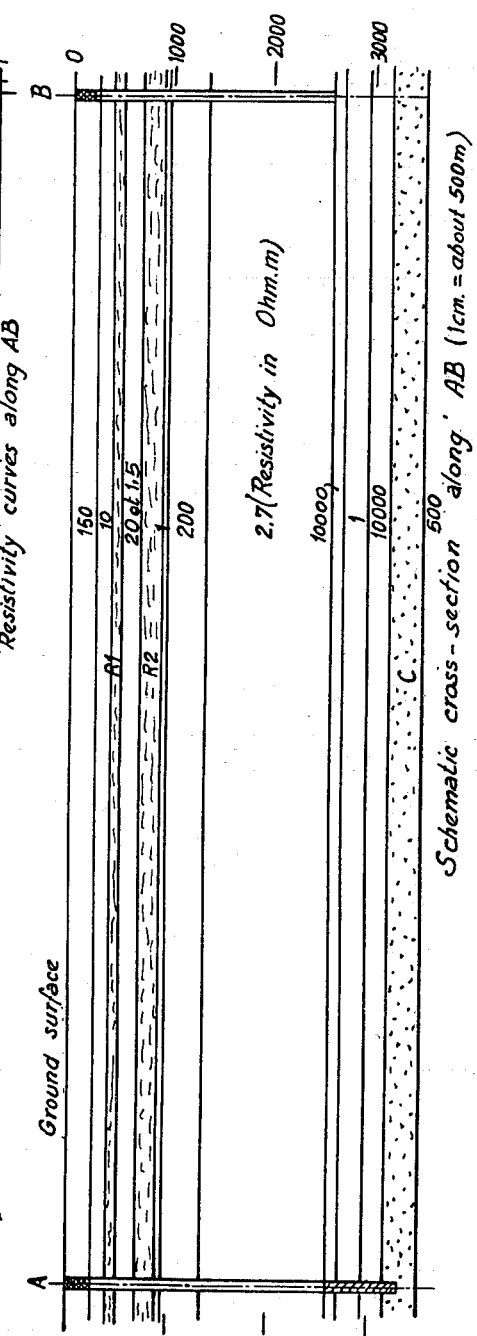
Fig. 11
Fig. 10

ELECTRIC PROSPECTING OF THE SUBSOIL WITH LINEAL ELECTRODES

BACKGROUND OF THE INVENTION

The invention relates to electrical prospecting of the subsoil.

Electrical prospecting has been known since the first works of Conrad Schlumberger were published in 1920. On the ground are placed two "ground terminals", or exciter electrodes; the latter are subjected to a continuous current, and this current is propagated through the different layers of the subsoil. The effects of this current are examined with the help of two detecting electrodes, which are moved step by step on the surface of the ground, each time measuring the potential difference.

Generally, the separation of the two detecting electrodes is small in relation to the distance between the two ground terminals. From each potential difference measured, an apparent resistivity of the subsoil is drawn which is associated with the midpoint of a segment joining the two measuring electrodes. By making these measurements at many points in the region of the two exciter electrodes, a map of apparent resistivity is made.

A geophysicist specialist can interpret the resistivity map, often with the help of other information, for example, geophysical information. At the present time, numerical mathematical treatments are used to determine a theoretical resistivity map from a probable model of the subsoil. By the difference between the map obtained on the terrain and the theoretical map, resistivity anomalies representing heterogenies of the subsoil can be obtained.

Subsoil prospecting techniques using alternating current are also known. However, their use is more rare because, compared to continuous current, the alternating currents have the tendency to be propagated less deeply in the soil even though their frequency is greater.

Thus, it is electrical prospecting using continuous current which is preferred. But, even though it reaches deeper layers than prospecting with alternating current, it is still difficult with this method to determine deep anomalies situated below a high resistivity masking layer. Deposits, whether they be petroleum, ore-bearing or geothermal, most often show up as this type of deep anomaly.

SUMMARY OF THE INVENTION

The present invention allows the precise determination of deep anomalous bodies which would not be visible with classical electrical prospecting methods.

The electrical prospecting process of the invention is of the type in which an electrical current is passed between two exciter electrodes respectively placed at two points on the surface of the subsoil, and in which is detected the potential difference between different pairs of electrodes on the surface of the soil, in the region of the exciter electrodes.

According to the invention, at least one of the two electrodes and preferably both exciter electrodes are lineal and continuous electrodes, extending lengthwise into the soil. For this purpose, one or two unused metallic tubings from exploratory bore holes often found near deposits to be examined or delimited can be used advantageously.

To measure, the potential differences are detected, as in classical electrical prospecting, at pairs of points extending over one or several profiles parallel to the straight segment joining the summits of the exciter electrodes. Thus is obtained one or several profiles of apparent resistivity, by the following formula:

$$\rho_a = K \cdot (\Delta V / I)$$

in which I designates the excitation current, $\Delta V$ designates the potential difference detected at each measuring point, and K is a geometric factor depending on the position of the measuring electrodes in relation to the exciter electrodes. This detection process is similar to that of the classical technique, but the expression of the factor K is different, and depends on whether a single deep lineal electrode is used, associated with a surface exciter electrode, or two deep lineal exciter electrodes are employed. The two expressions will be given later.

It is established that the simple examination of the thus obtained resistivity profile permits the presence of deep anomalies in the subsoil to be determined.

In a more detailed operation, the process according to the invention uses a preliminary model of the subsoil. To determine anomalies of the resistivity curve, first a profile of theoretical resistivity is constructed from the preliminary model of the subsoil with the help of numerical mathematical treatments. Then, the resistivity profile obtained on the terrain is compared to the profile of theoretical resistivity.

The preliminary model of the subsoil can be obtained with the help of geological information. Precise information obtained during "electric logging" which usually accompanies all drilling also can be used advantageously.

Most of the time, at least one classical electric sounding of the Schlumberger type of the zone to be studied is also available, and this is used to complete the preliminary model.

The principal stages for the determination of the theoretical profile of resistivity from this preliminary model of the subsoil will be given below. This model itself can be made in several ways.

According to a first method, we assume, as a first adaptation, that a drilling tube is a perfect conductor. The mathematical formulas thus obtained already provide a satisfactory interpretation of the experimental results, as will be shown below. However, applicants' work has shown that in reality, the tubings used present a certain resistance, especially when they reach great depth. A more elaborate theoretical approach takes into account this resistance presented by the drilling tubing or more generally by the deep lineal electrode or electrodes of the present invention.

To this end, applicants first of all propose a second simulated mathematical model taking into account the small resistance of the deep lineal electrode or electrodes. This second simulated mathematical model has brought to light effects relating to the point of application of the electrical current to the deep lineal electrode or electrodes.

Thus, according to another characteristic of the invention, the above-described process is used, but by applying the electrical current of the source to a point of the lineal exciter electrode or electrodes situated deep in the soil.

Advantageously, the electrical excitation current is applied to the deep end of the lineal electrode. The curve of apparent resistivity which is thus obtained gives more precise information as to the resistivity of the deep layers. In some cases, it even gives information which would not appear if the lineal exciter electrodes were connected to the current source by their surface end.

It is preferred that several series of measurements be performed with different points of applying the electrical current to the lineal exciter electrode. The different curves of apparent resistivity thus obtained bring complementary information as to the resistivity of the subsoil layers, and especially the deep layers.

Other characteristics and advantages of the invention will become apparent as the following detailed description proceeds, which contains several preferred methods of realizing the invention, in particular reference to the attached drawings.

BRIEF DESCRIPTION OF THE APPLICATION DRAWINGS

FIG. 4 is a graph illustrating in solid line the profile of apparent resistivity obtained with the classical arrangement of FIG. 1, on the straight line joining the exciter electrodes, as well as the profile of theoretical resistivity, in dash line and deduced from the model;

FIG. 5 is a graph illustrating in solid line the profile of apparent resistivity in the same conditions, but with the arrangement according to the invention of FIG. 2, as well as the profile of theoretical resistivity in dash line;

FIG. 6 illustrates in solid line the profile of apparent resistivity obtained in the same conditions, but with the arrangement of FIG. 3, as well as the profile of theoretical resistivity in dash line;

FIG. 10 illustrates another example of subsoil in a tabular structure, and

FIG. 11 illustrates curves of apparent resistivity obtained by applying the second mathematical simulation model, the lineal exciter electrodes being connected to the current source at the surface for curves S, and by their deep end for curves f.

DETAILED DESCRIPTION OF THE PREFERRED EMBODIMENTS

The following detailed description relates to examples taken from petroleum research. Petroleum deposits are generally found in layer-reservoirs principally constituted of salt water, and the resistivity of the deposit zone is higher than the resistivity of the salt water of the reservoir. But classical electrical prospecting only indicates the resistivity variation due to the presence of oil if, on the one hand, the layer-reservoir is thick enough and if the percentage of substitution is high, that is to say that it contains a lot of oil, and on the other hand if there are no high resistivity layers masking the layer-reservoir.

Applicants envision using a continuous current injected into the soil by one or two metallic drilling tubings, situated outside of the deposit, and extending at least to the layer-reservoir. Even though they relate to unproductive drilling, such unused tubings actually remain in place after reaching the salt water reservoir. Such a tubing, if it is connected at the surface to the current source, can thus constitute a vertical and deep electrode, which will hereinafter be referred to as a lineal electrode. The tubing often extends 2,000; 3,000 or even 4,000 meters in depth.

Applicants first observed that these drilling tubings presented an almost homogenous resistance along their entire length. The resistance is virtually nil along the entire line, except at the cementation line of the column, but it appears that even at this line, the resistance remains very small.

When a current is emitted from two lineal electrodes of such dimension, traversing a large number of layers having different resistivities, the distribution of the lines of current and of surface equipotentials is very different from that which would occur from surface punctual electrodes.

Likewise, the current density in each of the layers traversed by the tubing electrodes is very different from that which would occur in the same layers from surface electrodes. This density can be very high in conductive layers, no matter what their depth, while in the classical electrical prospecting device, it decreases very rapidly with depth. The density of the current will be elevated especially in the salt water layer-reservoir, which is very conductive, and all anomalous bodies situated in this layer could be expressed at the surface by a more marked anomaly than with a classical device.

Applicants proceeded first to experimental trials on an analogical model. It appears that prospecting with lineal electrodes increases the anomaly from 20 to 50% in relation to that which can be obtained with a classical device. Different actual trials were then made on known deposits.

Figure 1:
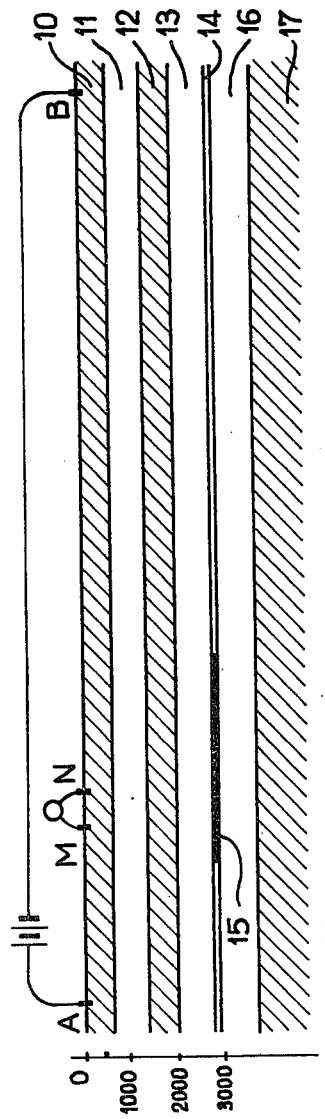
FIG. 1 is a section of subsoil and schematically illustrates the operation of classical or known electrical prospecting with two punctual exciter electrodes.
Figure 2:
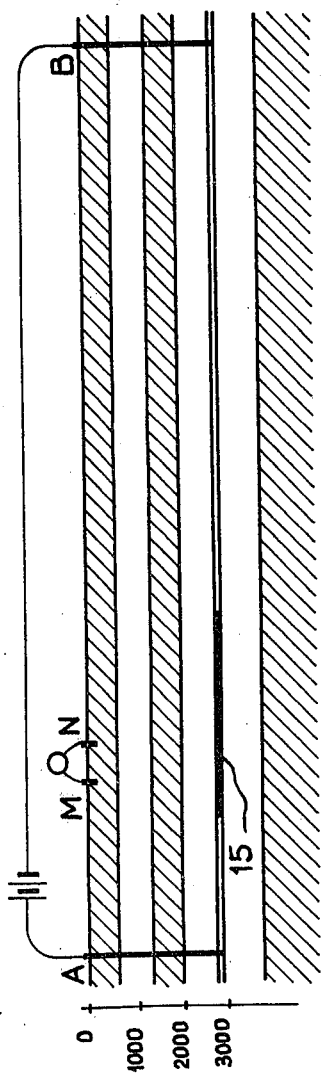
FIG. 2 illustrates, in the same subsoil sectional view, the operation of the process of electrical prospecting according to the invention, with two lineal exciter electrodes.
Figure 3:
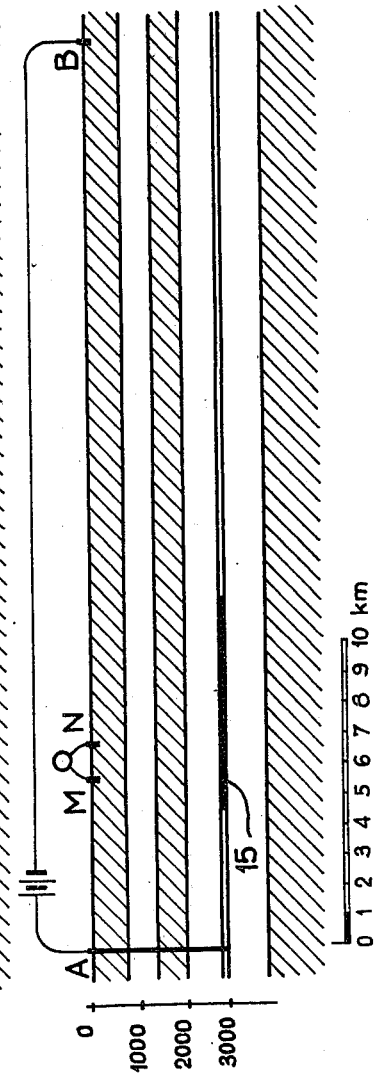
FIG. 3 illustrates another mode of operating the invention, with one lineal exciter electrode and one surface punctual exciter electrode.

The simplified general structure of one of the trials is represented on FIGS. 1 to 3. This structure is simplified according to the tabular model, with the assumption that the different layers are generally parallel to the soil.

Starting with the surface, the first layer 10 extends from the surface to a depth of 600 m., and has a resistivity of 200 ohm-m. The second layer 11 extends to a depth of 1300 m., and has a resistivity of 10 ohm-m. The third layer 12 extends from the second to the depth of 2000 m., and has a resistivity of 1000 ohm-m. The fourth layer 13 extends to a depth of 2900 m., and has a resistivity of 20 ohm-m. The fifth layer 14 is a thin layer-reservoir of salt water whose general resistivity is 0.5 ohm-m. On the drawings, it can be seen that this layer 14 contains a deposit of oil 15. Layer 14 is followed by layer 16, which extends to the depth of 3500 m. and has a resistivity of 20 ohm-m. At the depth of 3500 m. is a very resistant substratum 17, which in this model is assumed to extend to infinity.

First, a classical resistivity profile was recorded, with two surface electrodes A and B being spaced 30 km. apart, and a pair of detecting electrodes M and N being separated by 500 m. and displaced along segment AB, to obtain a profile of apparent resistivity. This profile appears in solid line in FIG. 4, where the abscissa is in kilometers, and the ordinate is the resistivity in ohm-m. It is seen that the profile of FIG. 4 presents no well marked disturbance at the level of the deposit, with the high resistivities obtained principally expressing the effect of the very resistant layers 10 and 12.

As shown in FIG. 2, electrical prospecting according to the invention was then performed, with two lineal tubing electrodes A and B. The detection by points M and N separated by 500 m. was made in the same way. The resistivity profile obtained is represented by the solid line profile of FIG. 5.

To determine this apparent resistivity, the formula given above was used. Applicants have determined that for two lineal electrodes, the factor K should be defined by the following expression:

$$K = \frac{2\pi}{\frac{1}{L_a} \text{Log} \left\{ \frac{\frac{L_a}{AM} + \sqrt{1 + (L_a/AM)^2}}{\frac{L_a}{AN} + \sqrt{1 + (L_a/AN)^2}} \right\} - \frac{1}{L_b} \text{Log} \left\{ \frac{\frac{L_b}{BM} + \sqrt{1 + (L_b/BM)^2}}{\frac{L_b}{BN} + \sqrt{1 + (L_b/BN)^2}} \right\}}$$

The two lineal exciter electrodes are $L_a$ and $L_b$ in length and are respectively placed at points A and B. In this equation, the variable detection points are designated by M and N and the geometric factor K is defined as a function of points M and N.

FIG. 5 shows that the apparent resistivities are much smaller than in the case of FIG. 4. They principally give an account of the resistivities of the conducting layers. FIG. 5 very definitely shows an asymmetry and an anomaly which correspond to the position of the oil layer 15 in the subsoil.

Referring to FIG. 3, another operation of the process according to the invention was performed, but with one lineal electrode A near the oil deposit 15, and a classical punctual electrode placed at B. The detection measurements were made as before at point M and N at intervals of 500 m. along segment AB at the surface of the soil. Factor K, determined by the applicants for a lineal electrode and a punctual electrode, is given by the following expression, the variable detection points being designated by M and N and the geometric factor K being defined as a function of points M and N:

$$K = \frac{2\pi}{\frac{1}{BM} - \frac{1}{BN} - \frac{1}{L_a} \text{Log} \left\{ \frac{\frac{L_a}{AM} + \sqrt{1 + \frac{L_a^2}{AM^2}}}{\frac{L_a}{AN} + \sqrt{1 + \frac{L_a^2}{AN^2}}} \right\}}$$

where notations such as AN designate the measurement of the straight segment joining points A and N, while the Log designates the Napierien logarithmic function.

The profile of apparent resistivity obtained from the arrangement of FIG. 3 is the solid line curve in FIG. 6. This curve no longer presents the asymmetry of that of FIG. 5, because one of the electrodes is lineal and the other punctual. Nevertheless, an anomaly which corresponds well enough to the zone of the oil layer 15 is definitely seen. It will also be noted that the irregularity is very definitely on the side of the lineal electrode.

The detailed operation of the process according to the invention will now be described. During the drilling, "electric loggings" were made, which give precise information on the structure of the subsoil on a level with each of the drillings. A tabular model of the subsoil can be immediately obtained wherein the depth of the different layers as well as their resistivities are precisely known. Moreover, one or more electrical soundings with Schlumberger devices are performed, with variable lengths of line AB which allows the tabular model obtained by the electric loggings to be improved.

Thus, making use of the preliminary model, applicants have searched for a mathematical treatment to deduce the theoretical profiles of resistivity comparable to the profiles obtained on the terrain in FIGS. 5 and 6. They were able to establish such a mathematical treatment, taking into account the arrangement with lineal electrodes traversing several layers of different resistivity, assuming that the resistance of the lineal electrodes is zero.

I. FIRST MATHEMATICAL MODEL

The essential theoretical element is the calculation of the potential created by a lineal electrode in the subsoil.

Classically, the theoretical starting point is the fact that, in each layer of constant resistivity, the potential U satisfies the Laplace's equation $\Delta U = 0$, with the conditions of continuity to the separation surface of the different layers. Here, the fact that the lineal exciter electrode extends into at least one portion of the layers of the subsoil, must also be considered.

Writing the equation of Laplace in cylindrical coordinates z, r, $\phi$, the variables r and z are separated, observation being made that the variable $\phi$ does not intervene. This separation of variables leads to two differential equations, and the general solution sought is a continuous linear combination of the particular solutions appropriate to each of the two differential equations. To these classical stages is added, in each layer through which the lineal electrode passes, a supplementary term corresponding to the contribution of the electrode having the value of the potential.

Having thus determined the potential in each layer, the continuity of the potential and the vertical component of the current density at a level of each separation surface of the layers are described. This gives the relations of recurrence between the coefficients of the particular solutions in the above cited linear combination. These relations of recurrence are resolved by taking into account the fact that from the surface of the soil the air contributes nothing to the potential, and that there exists a substratum or bottom layer, which is followed by none other.

The subsoil is formed by n layers, counted starting from the surface of the soil, and resting on a substratum. The lineal electrode extends to the row q layer. The notations are the following:

$h_k$ is the thickness of the row k layer (k varies from 1 to n).

$\sigma_k$ is the conductivity of the row k layer (k varies from 1 to n+1).

$P_k$ is the length of the wall of the row k layer (k varies from 1 to n).

M is the total length of the lineal electrode.

$l_k$ is the length of the electrode portion in the row k layer with $l_k = h_k$ (k varies from 1 to q), except eventually for the last layer reached by the electrode (layer no. k=q).

I is the intensity of the continuous excitation current.

$K_k$ is the coefficient of transmission (classical) between the row k layer and row k+1 layer (k varies from 1 to n).

M designates a point on the surface of the soil.

r designates the distance from point M to the summit of the lineal electrode on the surface of the soil.

The following variables without dimensions are also used:

s designates the relation $r/h_1$.

t designates the product $\lambda \cdot h_1$, $\lambda$ being an integration variable.

$\beta_k = h_k/h_1$ and $\sqrt{\beta} = l_k/h_1$ $\hat{\sigma}_k = \sigma_k/\sigma_1$ $\hat{P}_k = P_k/P_1$ Also, the expression $\phi_q$ is used which causes the lineal electrode to intervene:

$$\phi_q = \sum_{k=1}^{q} \overline{\beta_k} \cdot \sigma_k$$

In these conditions, the expression of the potential $U_1(r)$ created at point M of the surface of the soil by the lineal electrode is as follows:

$$U_1(r) = \frac{I}{2\pi\sigma_1 h_1} \int_0^\infty \frac{D(t)}{\phi_q} J_o(t \cdot s) \, dt$$

with $$D(t) = \sum_{k=1}^{I} \frac{(1 - e^{-t \cdot \beta k})(1 + R_k(t) e^{-t \cdot \beta k})}{t[1 - R_k(t) S_k(t) e^{-2t \cdot \beta k}]} \cdot A_k(t), \text{ and}$$

$$A_k(t) = e^{-t \cdot Pk-1} \prod_{j=1}^{k-1} \frac{1 - K_j}{1 - K_j S_j(t) e^{-2t \cdot \beta j}}$$

These general expressions are slightly modified for k=1 and for k=q.

In these expressions, $\pi$ is the convention symbol designating a multiple product, and the functions $R_k(t)$, and $S_k(t)$ or $S_j(t)$ are functions of T for the k layer and the j layer which serve as coefficients in the linear combination of the two particular solutions mentioned above, and are determined by recurrence in the manner described.

Classically, the expression of the potential $U_1(r)$ created by a punctual electrode is written:

$$U_1(r) = \frac{I}{2\pi\sigma_1 r} \left[ 1 + \int_0^\infty E(t) J_o(t \cdot s) \, dt \right]$$

with $$E(t) = \frac{2 R_1(t) e^{-2t}}{1 - R_1(t) e^{-2t}}$$

One skilled in the art will immediately see that the expression of the potential of a lineal source is different from that of the potential of a punctual source.

Knowing the potential of a lineal source, it is possible to build a calculation algorithm for two or three dimensional models, using either one lineal and one punctual source, or two lineal and one punctual source, or two lineal sources.

From these calculations, applicant has determined the theoretical curves shown in dash line on FIGS. 4, 5 and 6.

II. INTERPRETATION OF THE EXPERIMENTAL TRIALS

The significant deviations between the solid line and dash line profiles can be expressed by a "residual" represented at the bottom of each of FIGS. 4, 5 and 6, in a scale twice as large.

In FIG. 4, the presence of the deposit is not expressed by any significant residual anomaly.

On the other hand, FIG. 5 shows a well marked residual anomaly whose limits precisely correspond to the limits of the deposit.

In the same way, in FIG. 6, the edge of the residual anomaly precisely corresponds to the limit of the deposit on the side of the lineal electrode A. On the other hand, on the side of the punctual electrode B, the limit is less definite, because the curve of the terrain is almost tangent to the curve of theoretical resistivity.

This apparent correspondence between anomalies found on the resistivity profile obtained according to the invention and the limits of the deposit is still not completely explained. It is of course possible that it expresses particular characteristics of the locations where the trials were performed. That being so, it remains that the location of the deposit was marked in all the cases by an obvious anomaly in the noted resistivity profiles, and this is in the real trials as well as in the simulated trials made on conducting paper.

These anomalies can be appreciated here by the simple visual examination of the resistivity profile, without it being absolutely necessary to interpose the theoretical models which have just been explained. Moreover, for at least some structures, it appears that the use of the theoretical model allows not only the existance of the deposit to be determined with good precision, but also its geographical limits.

III. VARIANTS IN APPLICATION

Figure 7:
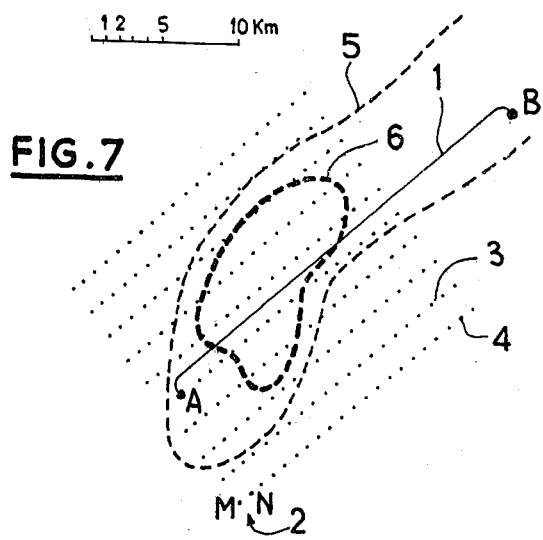
FIGS. 7, 8 and 9 illustrate different modes of covering the zone of exciter electrodes for different modes of operation of the process according to the invention.
Figure 8:
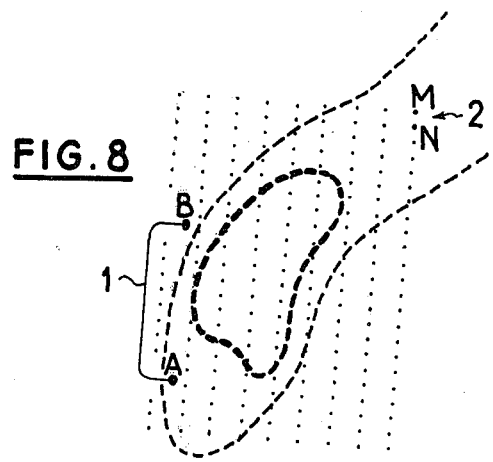
Figure 9:
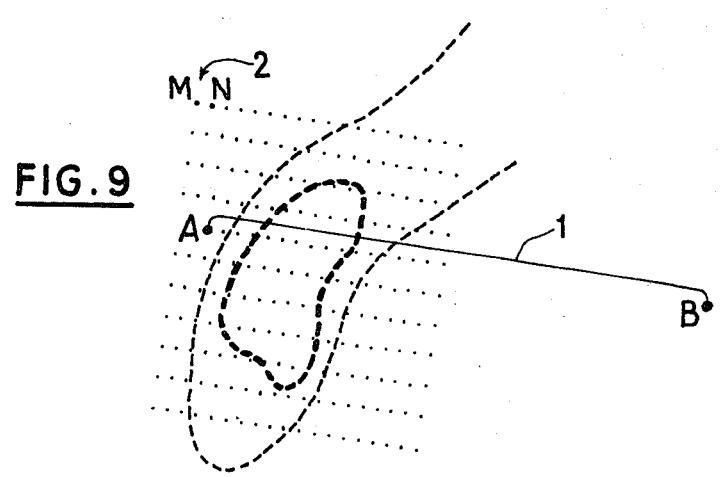

Referring to FIGS. 7, 8 and 9, different modes of application on the terrain of the process according to the invention are described. These figures are plan views of the surface of the soil, with the scale given at the top of FIG. 7.

In these figures, the fine dash line represents the assumed structure of the layer-reservoir. The thick dash line represents the possible extension of the deposit to be studied. In the example of FIG. 7, two separate drilling lineal tubings A and B are placed on either side of the deposit to be studied, having their ends in the salt water layer-reservoir. A cable and a source of continuous current connect these two electrodes A and B. Potential differences are measured on a series of segments parallel to segments A and B, and situated above the deposit to be studied. Each of the segments thus studied is represented by dotted lines whose points represent the position of detecting electrodes M and N, it being understood that each time, each of the detecting electrodes is advanced one step to the next point.

In this operation of the process according to the invention, it is advantageous that the distance between the tubings be much greater than the extent of the deposit between the tubings.

FIG. 8 illustrates another possible way of studying the same deposit, using the same tubing A as for FIG. 7, but with the other tubing B now on the same side of the deposit as tubing A. Detections are then made on straight segments parallel to segments A and B, which are almost all situated on the same side of the latter, which is to say with respect to the deposit, and which can have an extent greater than the length of segment AB. In this use of the process of the invention, the lineal tubing electrodes can be close to each other.

FIG. 9 represents a third embodiment of the invention. In this embodiment, a tubing-electrode A is used with a classical surface punctual electrode B placed on the other side of the deposit. The detecting electrodes are still placed along the straight segments parallel to segment AB. As in FIG. 7, it suffices to cover the surface situated above the assumed deposit with these straight segments. On the other hand, here it is preferable that the surface punctual electrode B be situated at a great distance from the other side of the deposit in relation to electrode A. Preferably, the distance between the deposit and point B is chosen to be at least equal to three times the distance between the deposit and point A.

Even though for convenience the detecting electrodes generally are moved along straight segments parallel to the segment joining the exciter electrodes, this is not necessary, and the position of the detection profiles can be changed in relation to the emission electrodes.

With the thus obtained measurements, a map of apparent resistivity can be made. As has been shown above, by comparing this map of apparent resistivity to the map of theoretical resistivity, a residual anomaly can be obtained which well represents the deep anomalous body.

The above description uses the first model of simulated mathematical treatment in which the resistance of the lineal electrodes comprising drilling tubings is assumed to be zero.

Having observed that a drilling tubing has a small but not zero electrical resistance, applicants then prepared a more precise mathematical model, taking the electrical resistance of the tube into account. Then, it was found that a different and complementary information could be obtained by varying the point where the excitation current is applied to the deep lineal electrode of the invention.

IV. MATHEMATICAL MODEL TAKING THE SMALL RESISTANCE OF THE TUBE INTO ACCOUNT

In section I, the calculation of the electrical potential created by a tubular source fed by a continuous current was first approximated by assuming that the tube was infinitely thin and infinitely conductive. A more precise mathematical model was then prepared assuming a small resistance in the tubing. The bases of calculation are the same as those which precede. The essential element is the calculation of the potential created by a lineal electrode in the subsoil.

As above, the theoretical departure point is the fact that, in each layer of the subsoil having constant resistivity, the potential U satisfies the Laplace's equation $\Delta U = 0$, with the conditions of continuity to the separation surface between the different layers of the subsoil. Here, account must also be taken of the fact that the lineal exciter electrode extends into at least one portion of the layers of the subsoil.

Writing the equation of Laplace in cylindrical coordinates $z$, $r$, $\phi$, the variables $r$ and $z$ are separated, the observation being made that variable $\phi$ does not intervene. This separation of variables leads to two differential equations, and the general solution sought is a linear combination of the particular solutions appropriate to each of the two differential equations. To these classical stages is added, in each layer through which the linear electrode passes a supplementary term corresponding to the presence of a source of current.

Now, account is taken of the particular characteristics of the tubing in each layer of the subsoil: its length, its resistivity, its useful section and the resistivity of the layer in which it is found.

To the variables and parameters previously defined are to be added three new parameters taking into account the resistivity of the drilling tube and designated by $\mu_j$, $A_j$ and $C_j$. $\mu_j$ characterizes the tube portion found in the row j layer of terrain, and it depends on the length, the useful section, the resistivity of the tube and the resistivity of the row j layer, and can be calculated from these givens, assumed to be known in advance. $A_j$ and $C_j$, by recurrence, allow the emissivity of each portion of the tube (this is no longer a constant as in section I) to be calculated.

As above, the potential is determined in each layer, then the continuity of the potential and of the vertical component of the current density at the level of each separation surface of the layers is written. This gives the recurrence relations between the coefficients of particular solutions in the linear combination. These recurrence relations are resolved by taking into account the surface of the soil and the substratum or last layer, which is followed by no other layer.

Thus is obtained the expression of the potential $U_1(r)$ created at point M on the surface of the soil by the lineal electrode:

$$U_1 = \frac{I}{2\pi h_1 \sigma_1} \int_0^\infty Q(t) \cdot J_o(st) \cdot dt,$$

with $$Q(t) = \sum_m^{tube} \frac{\pi_m(t) A_m e^{-(t+\mu_m)\hat{\tau}_m - 1}}{1 - R_m(t) S_m(t) e^{-2t\beta_m}}$$

$$\left\{ \frac{(1 - e^{-(t+\mu_m)\beta_m})(1 - R_m(t)C_m e^{-(t+\mu_m)\beta_m})}{t + \mu_m} + \right.$$

$$\left. \frac{(1 - e^{-(t-\mu_m)\beta_m})(R_m(t) e^{-(t+\mu_m)\beta_m} - C_m e^{-2\mu_m\beta_m})}{t - \mu_m} \right\}$$

The calculation of the apparent resistivity for a given device (measuring sources-points) is made as usual, from the value of:

$$U_1{}^h(s_1) - U_1{}^h(s_2) - U_1{}^h(s_3) + U_1{}^h(s_4),$$

the $U_1{}^h$ being relative to the homogenous subsoil having for resistivity the resistivity of the first reat terrain, and $s_1$, $s_2$, $s_3$, $s_4$ representing the respective reduced horizontal distances AM, AN, BM, BN, where A and B are the source electrodes while M and N are the measuring electrodes.

$U_1{}^h$ causes the term $Q^h(t)$ to intervene $$Q^{(h)}(t) = \sum_m^{tube} A_m{}^h e^{-(t+\mu_m{}^h)\hat{\tau}_m - 1} \left\{ \frac{1 - e^{-(t+\mu_m{}^h)\beta_m}}{t + \mu_m{}^h} - \right.$$

$$\left. \frac{C_m{}^h e^{-2\mu_m{}^h\beta_m}}{t - \mu_m{}^h} (1 - e^{-(t-\mu_m{}^h)\beta_m}) \right\}$$

with quantities $\mu_m{}^h$, $A_m{}^h$ and $C_m{}^h$ being obviously relative to the homogenous subsoil.

The geometric coefficient K is then given by:

$$K = \frac{2\pi h_1}{\int_0^\infty Q^h(t) [J_o(S_1 t) - J_o(S_2 t) - J_o(S_3 t) + J_o(S_4 t)] \cdot dt}$$

which relates to the case of an exciter electrode constituted by a deep tubing or lineal electrode.

It is understood that, following the principle of superposition of emitters of electrical current, one or several tubular electrodes and one or several punctual electrodes can be combined.

According to the present invention the point of contact between the source of electrical current and the tubing can be varied.

It is noted that the position of the source-tube contact comes into play only in the calculation of quantities $\mu_j$, $A_j$ and $C_j$, all the rest being unchanged.

V. APPLICATION OF THE PROCESS VARYING THE CONTACT POINT ON THE DEEP ELECTRODE

It is clear that the new, more precise theoretical model proposed does not modify the experimental results. It essentially allows an improved interpretation. From this second theoretical model, applicants have observed that different information can be obtained as to the structure of the subsoil, by varying the point where the deep lineal electrode is connected to the current source. This will now be demonstrated from a new theoretical model, referring to FIGS. 10 and 11.

FIG. 10 illustrates an example of tabular subsoil, which gives rise to apparent resistivity curve calculations with the help of the second mathematical model.

The characteristics of this subsoil are the following:

| Depth in meters | | Resistivity in Ohm-m |
|---|---|---|
| 0 | to | 250 | 150 |
| 250 | | 420 | 10 |
| 420 | | 490 | $R_1$ |
| 490 | | 555 | 20 |
| 555 | | 670 | 1,5 |
| 670 | | 860 | $R_2$ |
| 860 | | 950 | 1 |
| 950 | | 1 350 | 200 |
| 1 350 | | 2 600 | 2,7 |
| 2 600 | | 2 800 | 10 000 |
| 2 800 | | 3 050 | 1 |
| 3 050 | | 3 250 | 10 000 |
| 3 250 | | 3 500 | C |
| beyond | | 3 500 | 500 |

Three variants having been considered, with the values $R_1$, $R_2$ and C coming into play.

| (1) | $R_1 = R_2 = 10\,000\,\Omega m$ |
| | $C = 1\,\Omega m$ |
| (2) | $R_1 = R_2 = 20\,000\,\Omega m$ |
| | $C = 1\,\Omega m$ |
| (3) | $R_1 = R_2 = 10\,000\,\Omega m$ |
| | $C = 1\,000\,\Omega m$ |

Electrode A descends to 3,320 m. and has an assumed uniform resistivity of $10^{-7}$ Ohm-m. Electrode B descends to 2 600 m. and has a uniform resistivity of $10^{-7}$ Ohm-m.

In FIG. 11, curves $S_1$, $S_2$ and $S_3$ illustrate the apparent resistivity obtained according to the new model, in the three cases above respectively, where two tubular electrodes A and B are connected at the surface end to the current source. Curves $f_1$, $f_2$ and $f_3$ correspond to them, respectively, but where electrodes A and B are connected to the current source by their deep end. Such a deep connection can be made easily in drilling tubings. The connection is of the same type as those used for Schlumberger type electric logging.

It is seen that curves $f_1$ and $f_2$, as well as curves $S_1$ and $S_2$, allow variations in the resistivity of slightly deep layers $R_1$ and $R_2$ to be recognized. On the contrary, curve $S_3$ essentially blends into curve $S_1$, and thus provides no information on the variations in resistivity of the deep layer C. However, curves $f_1$ and $f_3$, which definitely differ one from another, amply provide information on the resistivity of this same deep layer.

Consequently, this simulation shows the advantage to be had by connecting the source of exciter current to the deep end of the lineal electrode, or more generally at a point of the latter which is intermediate between the surface and the deep end. It also shows the benefit in practicing the process of the invention by varying the point where the exciter electrodes are connected to the current source.

The process and apparatus arrangement of the invention is applicable in all its variants in the ways recommended by the present section V.

It is understood that the present invention is not limited by the embodiments described, but extends to all variants conforming to the spirit of the invention. In particular, the detailed description discloses a continuous current excitation, because it is this type of excitation which was used by applicants in the first trials, as well as in work on the theoretical models. It is understood that the invention also covers the application of all types of alternating current. In fact, if electrodes emitted at the surface of the soil cannot propagate themselves in depth, it is clear that the use of deep electrodes according to the invention provides a substantial improvement in results obtained in alternating current prospection.

One skilled in the art will understand that electrical prospecting according to the invention using continuous current can be combined with electrical prospecting according to the invention using alternating current, to obtain a more precise model of the subsoil. In the same way, prospecting modes according to the invention can be combined with prospecting modes according to earlier techniques, and in particular can be associated with electric logging which normally accompanies all drilling, before the intubation of the latter.

We claim:

1. A process for electrical prospecting of subsoil beneath a soil surface, comprising the steps of:

passing an electrical excitation current between two exciter electrodes planted at respective spaced locations relative to the soil surface;

detecting a potential difference between each pair of a plurality of pairs of points near the soil surface and spaced apart from the exciter electrodes; and determining, from said detected potential differences, residual anomalies of apparent resistivity of said subsoil, wherein at least one of the exciter electrodes is a continuous lineal electrode extending a substantial depth into the subsoil from a site near the soil surface, the continuous lineal electrode being in contact with the subsoil over a length corresponding to the depth to which the continuous lineal electrode extends into the subsoil.

2. A process according to claim 1, wherein each said continuous lineal electrode comprises a metallic drilling tubing.

3. A process according to claim 2, wherein each said continuous lineal electrode extends to a depth of between about 2000 and 4000 meters.

4. A process according to claim 2, wherein a lower end of at least one said continuous lineal electrode extends into the region of a salt water reservoir in the subsoil.

5. A process according to one of claims 1 or 2, wherein said step of detecting a potential difference comprises:
  detecting a potential difference between pairs of points at locations spaced along at least one line parallel to a line segment joining said spaced locations at which said exciter electrodes are planted; and
  wherein said step of determining residual anomalies comprises:
  determining a value of apparent resistivity for each said pair of points along said at least one line from the formula:

$$\rho_a = K \cdot (\Delta V / I)$$

wherein $\rho_a$ designates apparent resistivity, I designates the excitation current, $\Delta V$ designates the detected potential difference between a respective pair of said points, and K is a geometric factor dependent upon the position of said respective pair of said points in relation to the exciter electrodes and dependent upon the respective length over which each said at least one continuous lineal electrode is in contact with the subsoil;
  constructing a physical plot of said apparent resistivity values as a function of distance along said at least one line; thereby forming a profile of apparent resistivity along said at least one line;
  identifying said residual anomalies in said physical plot of apparent resistivity values, said residual anomalies corresponding to the location along said at least one line of anomalous subsurface formations; and
  preparing a physical record of the location along said at least one line of said identified anomalies, thereby providing a map of said corresponding anomalous subsurface formations.

6. A process according to claim 5, wherein one of the exciter electrodes is a punctual electrode planted at a location B, the other of the exciter electrodes is said continuous lineal electrode planted at a location A and having a length $L_a$ in contact with said subsoil, said respective pair of points is spaced at locations M and N along said at least one line parallel to a line segment joining locations A and B, and the geometric factor K is defined by:

$$K = \frac{2\pi}{\frac{1}{BM} - \frac{1}{BN} - \frac{1}{L_a} \text{Log} \left\{ \frac{\frac{L_a}{AM} + \sqrt{1 + \frac{L_a^2}{AM^2}}}{\frac{L_a}{AN} + \sqrt{1 + \frac{L_a^2}{AN^2}}} \right\}}$$

wherein AM, BM, AN, and BN designate respectively measurements of straight line segments joining locations A and M, locations B and M, locations A and N, and locations B and N, while Log designates the Napierian logarithmic function.

7. A process according to claim 5, wherein both said exciter electrodes are continuous lineal electrodes planted at respective locations A and B and having respective lengths $L_a$ and $L_b$ in contact with said subsoil, said respective pair of points is spaced at locations M and N along said at least one line parallel to a line segment joining locations A and B, and the geometric factor K is defined by:

$$K = \frac{2\pi}{\frac{1}{L_a} \text{Log} \left\{ \frac{\frac{L_a}{AM} + \sqrt{1 + (L_a/AM)^2}}{\frac{L_a}{AN} + \sqrt{1 + (L_a/AN)^2}} \right\} - \frac{1}{L_b} \text{Log} \left\{ \frac{\frac{L_b}{AM} + 1 + \sqrt{(L_b/BM)^2}}{\frac{L_b}{BN} + 1 + \sqrt{(L_b/BN)^2}} \right\}}$$

wherein AM, BM, AN, and BN designate respectively measurements of straight line segments joining locations A and M, locations B and M, locations A and N, and locations B and N, while Log designates the Napierian logarithmic function.

8. A process according to claim 5, wherein said step of identifying said residual anomalies includes the steps of:
  preparing a preliminary model of the subsoil;
  determining a theoretical resistivity profile for the preliminary model of the subsoil; and
  comparing said profile of apparent resistivity with the theoretical resistivity profile to determine the residual anomalies of said apparent resistivity profile and thereby identify the location along said at least one line of at least one said anomalous subsurface formation.

9. A process according to one of claims 1–2, wherein a precise location of a subsoil deposit is known, one of the exciter electrodes is a punctual electrode, the other of the exciter electrodes is said continuous lineal electrode, and said punctual electrode is located at a distance from the deposit which is at least three times greater than a distance at which said continuous lineal electrode is located from the deposit.

10. A process according to claim 5, wherein a precise location of a subsoil deposit is known, one of the exciter electrodes is a punctual electrode, the other of the exciter electrodes is said continuous lineal electrode, and said punctual electrode is located at a distance from the deposit which is at least three times greater than a distance at which said continuous lineal electrode is located from the deposit.

11. A process according to one of claims 1–2, wherein a presumed location of a subsoil deposit is known, and both of the exciter electrodes are continuous lineal electrodes planted at respective locations on opposing sides of the deposit, without touching the deposit.

12. A process according to claim 5, wherein a presumed location of a subsoil deposit is known, and both of the exciter electrodes are continuous lineal electrodes planted at respective locations on opposing sides of the deposit, without touching the deposit.

13. A process according to claim 11, wherein the exciter electrodes are spaced apart at a distance much greater than the presumed extend of the deposit between the electrodes.

14. A process according to claim 5, wherein the exciter electrodes are spaced apart at a distance much greater than the presumed extent of the deposit between the electrodes.

15. A process according to one of claims 1-2, wherein a presumed location of a subsoil deposit is known, and both of the exciter electrodes are continuous lineal electrodes planted at locations on the same side of the deposit, and relatively close to the deposit.

16. A process according to claim 5, wherein a presumed location of a subsoil deposit is known, and both of the exciter electrodes are continuous lineal electrodes planted at locations on the same side of the deposit, and relatively close to the deposit.

17. A process according to one of claims 1-2, wherein direct current is used for said electrical excitation current.

18. A process according to one of claims 1-2, wherein alternating current is used for said electrical excitation current.

19. A process according to claim 18, further comprising the steps of:
repeating said steps of passing electrical excitation current and detecting potential differences, with direct current used for said electrical excitation current; and
combining the respective detected potential differences obtained with use of alternating current with the detected potential differences obtained with use of direct current.

20. A process according to one of claims 1-2, wherein said step of passing electrical excitation current comprises applying said electrical excitation current to a point on each said continuous lineal electrode located deep in the subsoil.

21. A process according to claim 5, wherein said step of passing electrical excitation current comprises applying said electrical excitation current to a point on each said continuous lineal electrode located deep in the subsoil.

22. A process according to claim 20, wherein said point on each said continuous lineal electrode is substantially at a lowermost end thereof.

23. A process according to claim 22, wherein said point on each said continuous lineal electrode is substantially at a lowermost end thereof.

24. A process according to claim 20, further comprising repeating the step of applying said excitation current to a point on each said continuous lineal electrode located deep in the subsoil for a number of spaced points on each said continuous lineal electrode and, for each point on each said continuous lineal electrode to which said excitation current is applied, repeating said step of detecting potential differences.

25. A process according to claim 21, further comprising repeating the step of applying said excitation current to a point on each said continuous lineal electrode located deep in the subsoil for a number of spaced points on each said continuous lineal electrode and, for each point on each said continuous lineal electrode to which said excitation current is applied, repeating said step of detecting potential differences.

* * * * *